United States Patent [19]

Eifert

[11] Patent Number: 5,893,975

[45] Date of Patent: Apr. 13, 1999

[54] ENHANCED SUBSURFACE FLOW CONSTRUCTED WETLAND

[75] Inventor: Walter Eifert, Martinsburg, W. Va.

[73] Assignee: Roux Associates, Inc., Islandia, N.Y.

[21] Appl. No.: 08/842,393

[22] Filed: Apr. 23, 1997

[51] Int. Cl.[6] .................................................. C02F 3/32
[52] U.S. Cl. .......................... 210/602; 210/610; 210/617;
210/150; 210/170; 210/206; 210/254; 210/747
[58] Field of Search .............................. 210/602, 610,
210/617, 620, 150, 170, 254, 259, 202,
206, 747, 901

[56] References Cited

U.S. PATENT DOCUMENTS

| | | | |
|---|---|---|---|
| 3,770,623 | 11/1973 | Seidel | 210/602 |
| 4,218,318 | 8/1980 | Niimi et al. | 210/170 |
| 4,333,837 | 6/1982 | Plosz | 210/602 |
| 4,591,443 | 5/1986 | Brown | 210/747 |
| 4,678,582 | 7/1987 | Lavigne | 210/750 |
| 4,810,385 | 3/1989 | Hater et al. | 210/610 |
| 4,839,051 | 6/1989 | Higa | 210/602 |
| 4,952,315 | 8/1990 | Saab | 210/610 |
| 4,997,568 | 3/1991 | Vandervelde et al. | 210/150 |
| 5,078,882 | 1/1992 | Northrup | 210/602 |
| 5,156,741 | 10/1992 | Morrison | 210/602 |
| 5,171,687 | 12/1992 | Moller et al. | 210/610 |
| 5,200,081 | 4/1993 | Stuth | 210/615 |
| 5,227,068 | 7/1993 | Runyon | 210/610 |
| 5,273,653 | 12/1993 | Kickuth | 210/602 |
| 5,302,286 | 4/1994 | Semprini | 210/610 |
| 5,336,402 | 8/1994 | Yamamoto | 210/194 |
| 5,337,516 | 8/1994 | Hondulas | 47/65 |
| 5,368,411 | 11/1994 | Losack | 405/128 |
| 5,378,355 | 1/1995 | Winkler | 210/136 |
| 5,407,572 | 4/1995 | McGuire | 210/259 |
| 5,411,665 | 5/1995 | Scraggs | 210/610 |
| 5,433,845 | 7/1995 | Greene et al. | 210/170 |

(List continued on next page.)

OTHER PUBLICATIONS

"Constructed Wetlands", Roux Associates, Islandia, NY, brochure, 2 pages, 1996.

*Water Well Journal*, "Undoing the Damage, Wetland Treat Ground Water Contaiminated by Mine Drainage–Naturally", Article by Kristin D. Godsey, pp. 40–46 Jun. 1993.

"Designers Choice for Quality Drainage Systems—Contractor", Cultec, Inc., Brookfield, CT, brochure, 3 pages, undated.

"Woodscape for Ornamental Landscapes" Vigoro Industries, Inc., Fairview Heights, IL, 3 pages, Apr. 1994.

Declaration of Applicant Walter Eifert dated Aug. 21, 1998 3 pages with West Virginia Dept. of Environmental Protection Public Notice dated Sep. 19, 1994 (2 pages) and one page letter of Robert Bates dated Sep. 15, 1994 (1 page).

*Primary Examiner*—Christopher Upton
*Attorney, Agent, or Firm*—Alfred M. Walker

[57] ABSTRACT

A subsurface flow constructed wetland treats a variety of flowing wastewater effluents, provides pre-treatment clog-reducing wastewater sludge disintegration, and adds pre-treatment nutrients to wastewater so as to enhance microbial growth therein for improving the effectiveness and efficiency of wastewater treatment. The constructed wetland includes a wastewater treatment system having a flow intake, a pre-treatment nutrient addition chamber, and a wastewater flow divider. The flow divider further has a compressed air aerator in the bottom thereof. The constructed wetland includes one or more treatment cells having a soil, fine stone, organic and/or synthetic material substrate cap covering a further substrate media accommodating the wastewater to be treated. The substrate cap is populated by natural plants having root systems extending within the substrate. The plant root systems extend from the substrate downward into the wastewater being treated, and the roots serve to physically and/or biologically mediate the removal of undesirable components from the wastewater so as to cleanse and thus treat the wastewater. The constructed wetland includes a treated water discharge conduit for discharging the flowing water into a desired after treatment water utilization modality, such as to discharge to the ground or to a body of water.

27 Claims, 6 Drawing Sheets

U.S. PATENT DOCUMENTS

| | | | |
|---|---|---|---|
| 5,451,325 | 9/1995 | Herkenberg | 210/693 |
| 5,486,291 | 1/1996 | Todd et al. | 210/602 |
| 5,518,618 | 5/1996 | Mulder | 210/629 |
| 5,520,483 | 5/1996 | Vigneri | 405/128 |
| 5,549,817 | 8/1996 | Horsley | 210/122 |
| 5,549,828 | 8/1996 | Ehrlich | 210/602 |
| 5,554,289 | 9/1996 | Grounds | 210/607 |

ENHANCED SUBSURFACE FLOW CONSTRUCTED WETLAND

FIELD OF THE INVENTION

The present invention relates to the use of subsurface flow constructed wetlands for the treatment of a variety of wastewater effluents and particularly to apparatus and methods for adding supplemental oxygen, providing up-front anti-clogging sludge management, and adding nutrients to enhance microbial growth

BACKGROUND OF THE INVENTION

Constructed wetland treatment technology is presently being used world-wide for the efficient and cost-effective treatment of a variety of wastewater effluents Present applications include treatment of municipal and industrial wastewaters, urban stormwater, acid mine drainage (AMD), landfill leachate and agricultural runoff However, as an emerging technology, much remains to be done to enhance performance and provide long-term and reliable operation As noted in Roux, "Constructed Wetlands", informational brochure, 2 pages, 1996, two categories of constructed wetlands treatment technology are currently recognized These are Free Water Surface (FWS) Systems which are similar to a natural marsh, and Subsurface Flow (SSF) Systems which are constructed in excavated and lined trenches back filled with an organic or inorganic treatment media Treatment in an subsurface flow (SSF) system occurs within the media matrix below the surface of the bed. The subsurface flow (SSF) type systems are generally much more efficient, require less space, do not present odor or vector problems and are not subject to freezing They are also aesthetically pleasing Present disadvantages of subsurface flow (SSF) type systems include limited dissolved oxygen transport to the subsurface environment and sludge accumulation and clogging of the treatment media matrix The combination of these factors has resulted in reduced and erratic system performance The prior art is replete with inventions relating to the treatment of wastewater effluents. The following United States patents are not directly related to the use of constructed wetlands but deal with a variety of problems related to wastewater treatment Mulder et al. U.S. Pat. No. (5,518,618) discloses a system and process for purifying wastewater which contains nitrogenous compounds. Using an apparatus with a first aerated chamber and a second oxygen depleted chamber, wastewater is treated with a sludge containing microorganisms. Stuth U.S. Pat. No. (5,200,081) describes a secondary sewage treatment system using a tank with buoyant media to be interposed between a septic system and a drainfield. Stuth '081 uses aerators to recirculate wastewater to mixing zones, where the wastewater is mixed with the buoyant media in a turbulent fashion. Yamamoto et al. U.S. Pat. No. (5,336,402) relates to a sewage treatment apparatus consisting of an aeration chamber and a settling chamber into which aerated water is introduced from the aeration chamber for sedimentation of sludges. The second chamber has a hopper unit for the discharge of sludge. Vigneri U.S. Pat. No. (5,520,483) discloses a method and system for remediation of hydrocarbon-contaminated subterranean body of groundwater. It involves the use of a plurality of wells to induce the desired chemical reaction of acetic acid and hydrogen peroxide resulting in the generation of hydroxyl free radicals for oxidizing the contaminants. Scraggs et al. U.S. Pat. No. (5,411,665) describes the use of a multi-stage, recirculating series of treatment tanks with oil-consuming microorganisms for reducing and separating emulsions and homogeneous components from contaminated water. Semprini et al. U.S. Pat. No. (5,302,286) describes a method and apparatus for in situ groundwater remediation. Using a well with a venturi section, recirculated water is passed through permeable sections where aeration as well as gaseous or liquid biological nutrients are added.

Herkenberg U.S. Pat. No. (5,451,325) discloses the use of oleophilic substrates to absorb oil from off-shore oil slicks. Winkler U.S. Pat. No. (5,378,355) describes the use of periodically spaced aeration diffusers placed along a linearly extending air distributor conduit. The air diffusers are used to treat wastewater, as well as for a method for in-situ cleaning of the diffusers by supplying liquid or gaseous cleaning fluids to the diffusers The wastewater is treated in a tank.

McGuire U.S. Pat. No. (5,407,572) describes a tertiary wastewater treatment facility using adsorption and filtration. Losack U.S. Pat. No. (5,368,411) discloses a treatment method for treating oil contaminated soil by breaking up the soil, and mixing it with water and a detergent to produce a slurry, and ultimately separating the cleaned soil from the slurry.

Saab U.S. Pat. No. (4,952,315) teaches the use of a method to treat hydrocarbon contaminated water or soil with emulsifiers and bacteria in a closed tank environment Brown U.S. Pat. No. (4,591,443) discloses oxidation of subterranean contaminants from leaking tanks. The oxidation agents are injected directly into the subterranean environment Ehrlich U.S. Pat. No. (5,549,828) describes in-situ treatment of water bodies by means of an artificial, submerged chamber having air diffusers for forcefully guiding water through filtering media and through rafted or floating vascular plants. Similarly, Hondulas U.S. Pat. No. (5,337,516) discloses treating polluted water using wetland plants in a confined, floating environment More closely related to constructed wetlands, the following three patents are concerned with various aspects of wastewater treatment.

Grounds U.S. Pat. No. (5,554,289) discloses an apparatus and method for increasing the capacity of a wastewater pond treatment facility including the use of a porous baffle placed in the pond so as to divide the pond into two sections. In the first section, biological solids are treated with aeration and the use of concentrated bacteriological growth, while the second portion is used to accommodate high rates of wastewater flows from storms A microprocessor is used to control the use of various electromechanical subsystems Horsley et al. U.S. Pat. No. (5,549,817) describes a stormwater treatment system/apparatus designed to collect the first flush of stormwater runoff (which contains the majority of pollutants) and to treat this effluent using sedimentation, filtration and constructed wetlands The apparatus is designed as a self-contained integrated module amenable to mass productions It includes the sedimentation tank surrounded by a ring shaped tank which houses the subsurface flow (SSF) type constructed wetland Multiple modules can be used for larger capacity installations Morrison et al. U.S. Pat. No. (5,156,741) discloses a wastewater treatment system and method incorporating a subsurface flow (SSF) type constructed wetland utilizing turf grass as the vegetation for bioremediation of secondary treated municipal wastewater. A recirculatory system is used for the subsurface wastewater along with aeration of the subsurface water throughout the bed to enhance turf grass root growth down into the treatment media However, the prior art does not provide a remedy for the general problems of up-front sludge removal and passive nutrient addition in subsurface flow (SSF) type constructed wetlands

OBJECTS OF THE INVENTION

It is therefore an object of the present invention to provide an influent distribution system for subsurface flow (SSF) constructed wetlands, which adds supplemental oxygen and removes matrix clogging sludge It is another object of the present invention to use a prefabricated sludge storage chamber placed across the head-end width of the treatment bed of the constructed wetland It is a further object of the present invention to install a supplemental air diffuser system along the bottom of the influent distribution chamber therein to facilitate initial precipitation of sludge and to prevent potential septic and/or anaerobic conditions at the initial point of treatment to significantly enhance system performance It is yet another object of the present invention to increase the design life of the media bed of a treatment cell of a constructed wetland and to reduce its required size.

It is also an object of the present invention to provide a convenient and low-cost means of dispensing nutrients to biologically-based wastewater treatment systems.

It is a further object of the present invention to provide for the passive solubilization and release of nutrients (i.e., phosphorus, nitrogen, potassium, trace micronutrients, etc.) from granular and briquette type commercial fertilizers It is another object of this invention to provide a nutrient addition chamber that can control the dissolution rate through product manipulation (i.e. water solubility of selected fertilizers), hydraulic retention time manipulation and/or through mechanical agitation.

It is a further object of this invention to provide a nutrient addition chamber that can be installed either above or below grade.

It is yet another object of this invention to provide a nutrient addition chamber for either active (i.e. pump-controlled) or passive (head-controlled) operation.

SUMMARY OF THE INVENTION

In keeping with these objects and others which may become apparent, the present invention includes a subsurface flow (SSF) constructed wetland that treats a variety of flowing wastewater effluents, provides pre-treatment clog-reducing wastewater sludge disintegration, and adds pre-treatment nutrients to wastewater so as to enhance microbial growth therein for improving the effectiveness and efficiency of wastewater treatment The preferred embodiment for a constructed wetland includes a wastewater treatment system having a flow intake, a pre-treatment nutrient addition chamber, and a wastewater flow divider. The flow divider further has a compressed air aerator in the bottom thereof The constructed wetland includes one or more treatment cells having a soil or fine stone substrate cap covering the wastewater to be treated within a soil, gravel, organic or synthetic material media-matrix The substrate cap is populated by natural plants, such as Phragmites sp., Typha sp. and/or Scirpus sp. having root systems extending within the substrate cap. The plant root systems extend from the substrate cap downward into the media-matrix accommodating the wastewater being treated, and the roots serve to biologically mediate, filter and/or adsorb undesirable components from the wastewater so as to cleanse and thus treat the wastewater.

The constructed wetland also includes a treated water discharge conduit for discharging the flowing water into a desired after treatment water utilization modality, such as to discharge to the ground water, surface water or utilize as irrigation water.

BRIEF DESCRIPTION OF THE DRAWINGS

The present invention can best be understood in conjunction with the accompanying drawings, in which.

DETAILED DESCRIPTION OF THE INVENTION

Figure 1:
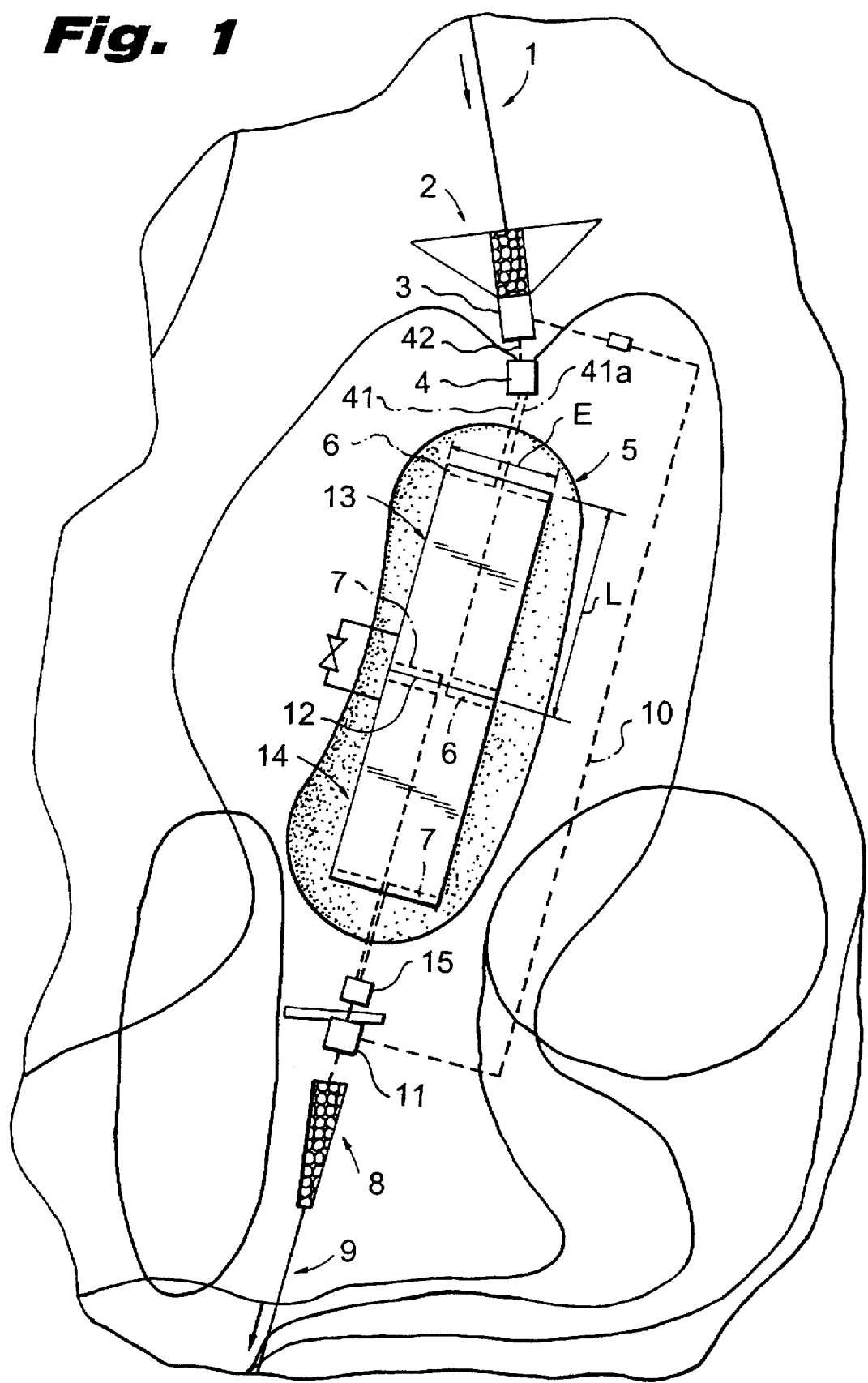
FIG. 1 is a top plan view of a detail of a site plan incorporating an enhanced subsurface flow (SSF) type constructed wetland of the present invention.

As an example of an enhanced subsurface flow (SSF) constructed wetland, FIG. 1 shows a detail from a particular site plan for a typical water utilization modality, such as a wastewater treatment facility at a land use site, for example, a golf course, to treat water in an existing stream having an upstream untreated stream flow portion 1 and a downstream treated stream flow portion 9.

The constructed wetland may be used with other land use projects, such as housing developments, agricultural areas, commercial and industrial developments, municipal parks and other open space preserves The construction of the constructed wetland generally follows the preexisting stream course. The polluted stream 1 is directed into the system by inflow apron 2 which further leads into energy dissipation chamber 3, such as in the form of a concrete vault to slowdown stream flow 1 and to dissipate the forward flowing force of upstream flow 1, so as to control the rate of flow thereof Stream flow 1 then is conveyed into a key feature of the present invention, namely influent control/fertilizer nutrient addition chamber 4.

Figure 1A:
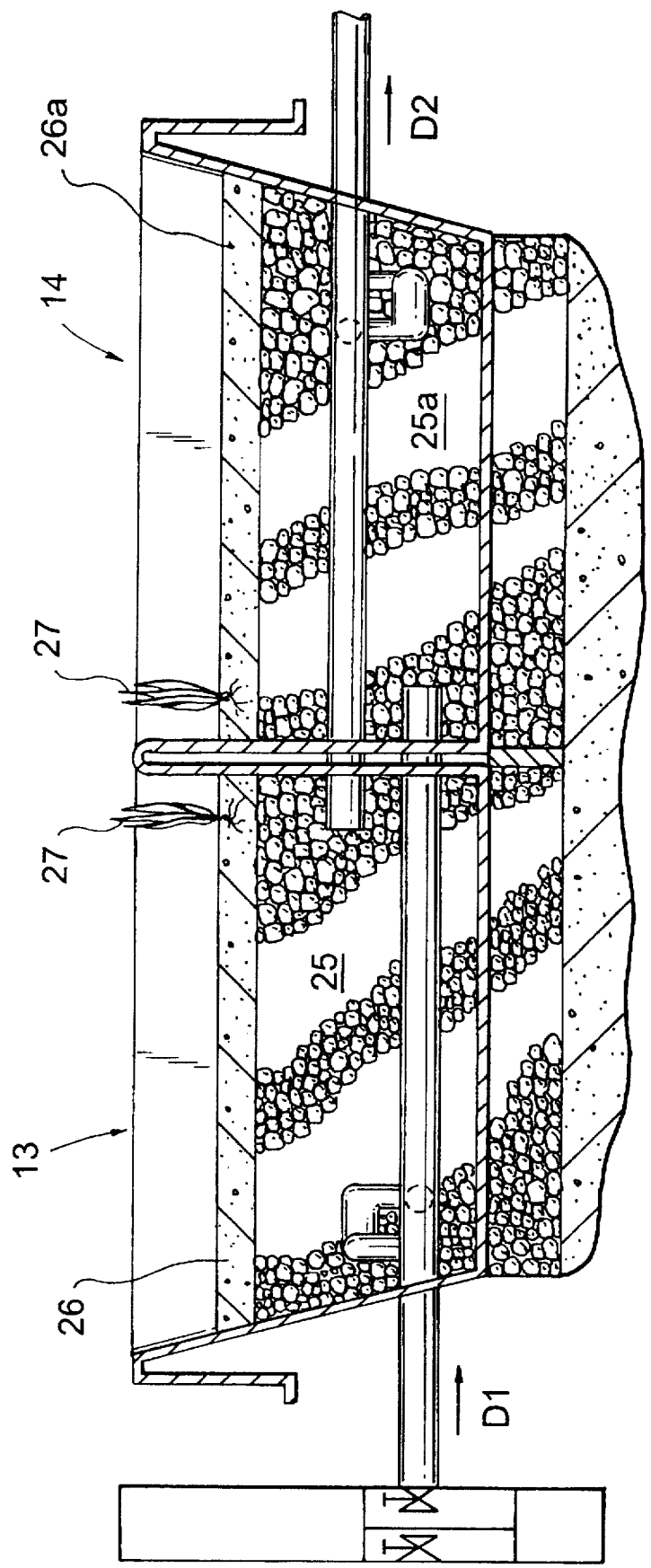
FIG. 1A is a cross sectional view of the treatment cell portions of the constructed wetland, as in FIG. 1.

Optionally, nutrient addition chamber 4 can also have genetically engineered microorganisms therein, to assist in hydrocarbon removal As shown in FIGS. 1 and 1A, constructed wetland 5 is implemented as two treatment cells 13 and 14 separated by a concrete block cell dividing wall 12. Although the size and number of treatment cells 13, 14 may vary according to need, treatment cells 13, 14 are typically 88×112' to accommodate 7350 GPD.

Treatment cells 13, 14 generally include a body of water accommodated in respective gravel, stone, soil, organic or synthetic material media substrates 25, 25a, which are submerged below respective planting substrate caps 26, 26a of soil, gravel, organic or synthetic material Each respective substrate cap 26 or 26a has botanical plants 27 growing therein. A portion of the roots of plants 27 may extend into respective substrate caps 26, 26a, or into the submerged body of water and respective substrate media 25, 25a below. Preferably, plants 27 include Phragmites sp., Typha sp. and/or Scirpus sp. obtained from on-site sources, such as non-jurisdictional wetlands and drainage ditches, etc. The plants may also be procured from commercial nurseries Although treatment cells 13, 14 are submerged below respective planting substrate caps 26, 26a, the constructed wetland of the present invention is preferably aerobic, in that oxidation takes place. Moreover, while hydrocarbons in untreated water flow 1 may be treated by microbes within the roots of plants 27, oxygenation also removes metals and related compounds, such as nitrogenous substances, biochemical oxygen demanding materials (BOD's) and metals, from untreated water in stream flow 1 These materials and related compounds are detoxified and/or precipitated and stored in lower media matrix 25 or 25a.

However, alternatively treatment cells 13, 14 can be optionally anaerobic if removal of metals and related compounds is most important The number of cells 13, 14 and their size, placement and substrate configuration is site specific depending on many parameters such as stream flow, degree and type of pollution being remediated, and terrain constraints Flow Divider Embodiment As also shown in FIG. 1, nutrient addition chamber 4 feeds water into cells 13 and 14 by separate conduits into respective inflow control areas 6 lying across each head-end of treatment cells 13 and 14.

Inflow control areas 6 act as a flow divider for incoming stream 1, and are an integral part of the influent distribution system which is the second major feature of the present invention Inflow control areas 6 have an end width "E" and length "L" as designated by the arrows in FIG. 11 Flow of treated wastewater leaves each treatment cell 13 and 14 through separate effluent collection piping 7 across the respective tail end of each treatment cell, and through separate conduits to level control chamber 15, where the flows merge and pass to a stormwater by-pass chamber 11 and thence to an outflow apron 8, finally joining the existing treated downstream stream bed 9.

Conduit 10 is a large diameter stormwater bypass which guides large volumes of uncontaminated storm water around the treatment facility during brief periods of such high flow activity.

Figure 2:
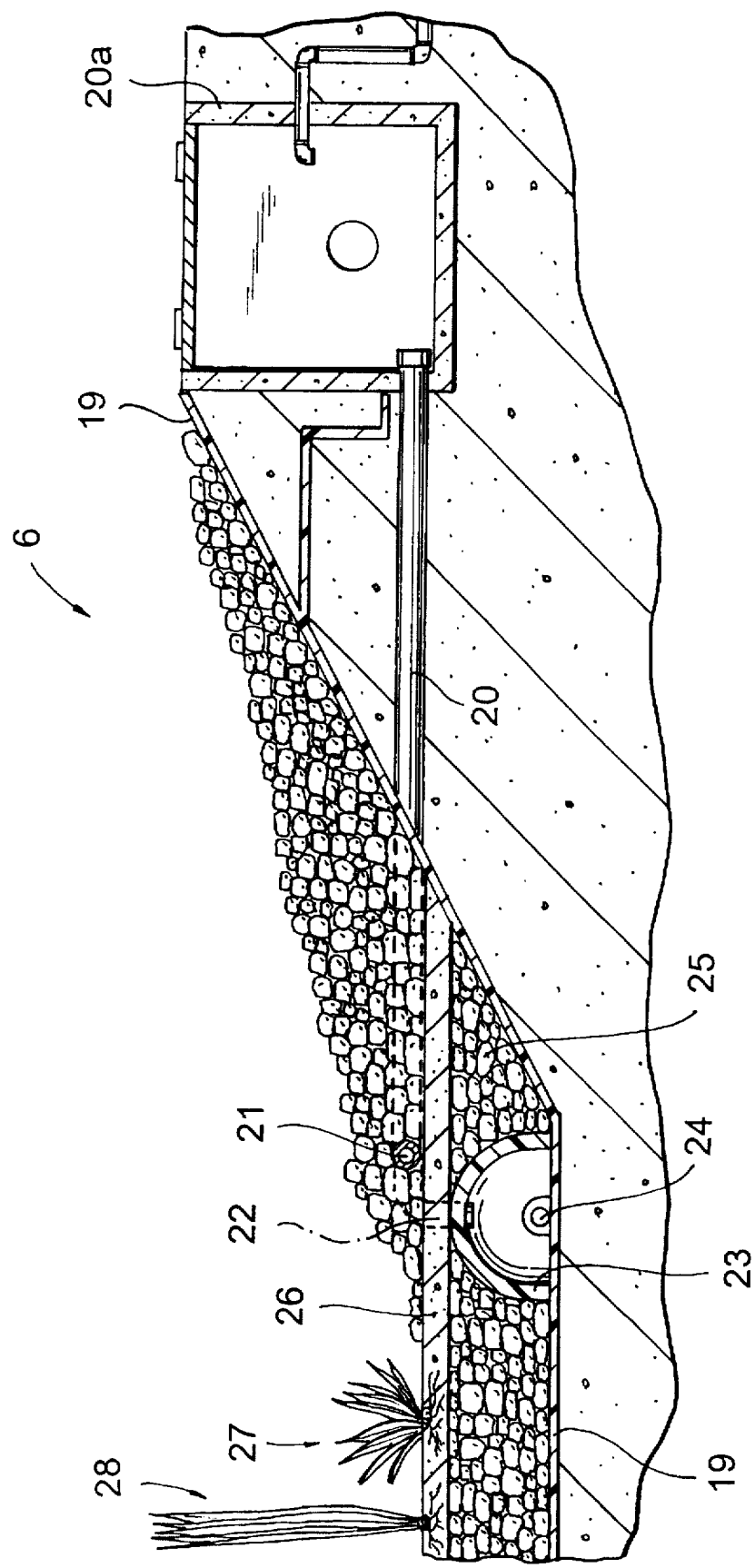
FIG. 2 is a side elevational view in cross section of a detail of the inflow control portion of a treatment cell of a constructed wetland of the present invention, showing the inflow distribution system.

FIG. 2 is a section detail of inflow control area 6, located at the head end of a treatment cell, such as cell 13 or 14. The salient features of a subsurface flow (SSF) treatment cell include a trench with liner 19 typically such as a high density polyethylene (HDPE) of 40 mil thickness Larger stone, soil, organic or synthetic treatment media substrate 25 fills the lower portion of the lined trench, with smaller stone or soil substrate cap 26 forming the planting substrate for plants such as common cattail 28 and three square bullrush 27.

The flow divider features of inflow control area 6 include for example, conduit 20, such as six inch PVC plastic pipe, which conduit 20 conveys wastewater to be treated from holding chamber 20a, such as of precast concrete of 175 gallon capacity, into inflow control box 23, through a T-formation configuration, including conduit 20, which is parallel to the direction of incoming stream flow 1 and perpendicular to lateral distribution header 21. Linearly extending air diffuser line 24 lies within inflow control box 23, and extends parallel to lateral distribution header 21. Air diffuser line 24 supplies compressed air, which is discharged through strategically placed self-cleaning diffusers (not shown) such as described in U.S. Pat. No. 5,378,355 of Winkler, to aerate wastewater inside inlet control box 23. Distributor header 21 and air diffuser line 24 both extend lengthwise across inlet control box 23, which extends up to 88 feet in width, to correspond to the end width E of treatment cells 13, 14, as shown in FIG. 11

Figure 3:
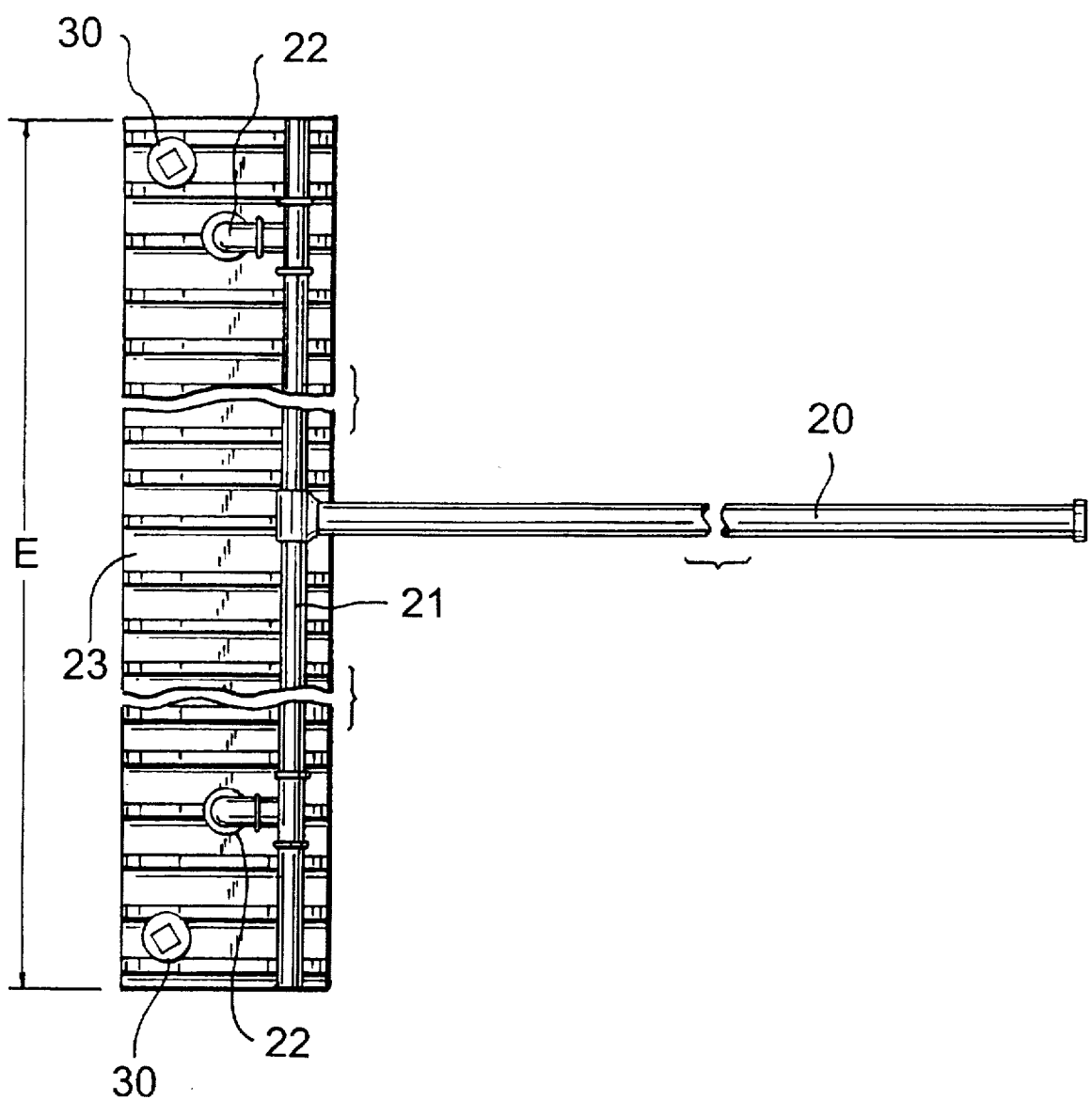
FIG. 3 is a top plan view of an inflow control box of the inflow control portion of constructed wetland cell, as in FIG. 2 therein.

FIG. 3 shows a top view of the apparatus of this influent distribution flow divider system which lies across the entire width of the head end of a treatment cell. This system is designed to correct two problems often found in subsurface flow (SSF) type constructed wetlands, namely limited dissolved oxygen transport to the subsurface environment and sludge accumulation and clogging of the treatment media matrix. Although other subsurface flow (SSF) systems have attacked these problems separately (see Grounds U.S. Pat. No. 5,554,289, Yamamoto et al. U.S. Pat. 5,336,402 and Morrison et al. U.S. Pat. No. 5,156,741), they have not been dealt with in a low-cost integrated fashion for general construction of subsurface (SSF) type constructed wetlands.

For example, by transversely spreading out the flow of incoming stream flow 1 through lateral distribution header 21 and elbow outlets 22, and then aerating the spread out stream flow 1, clogging of stream flow 1 by accumulated sludge therein is reduced. Access ports 30 on the top of inflow control box 23 allow for periodic removal of accumulated sludge. Aeration also increases transportation of dissolved oxygen to respective treatment cells 13, 14.

Figure 3A:
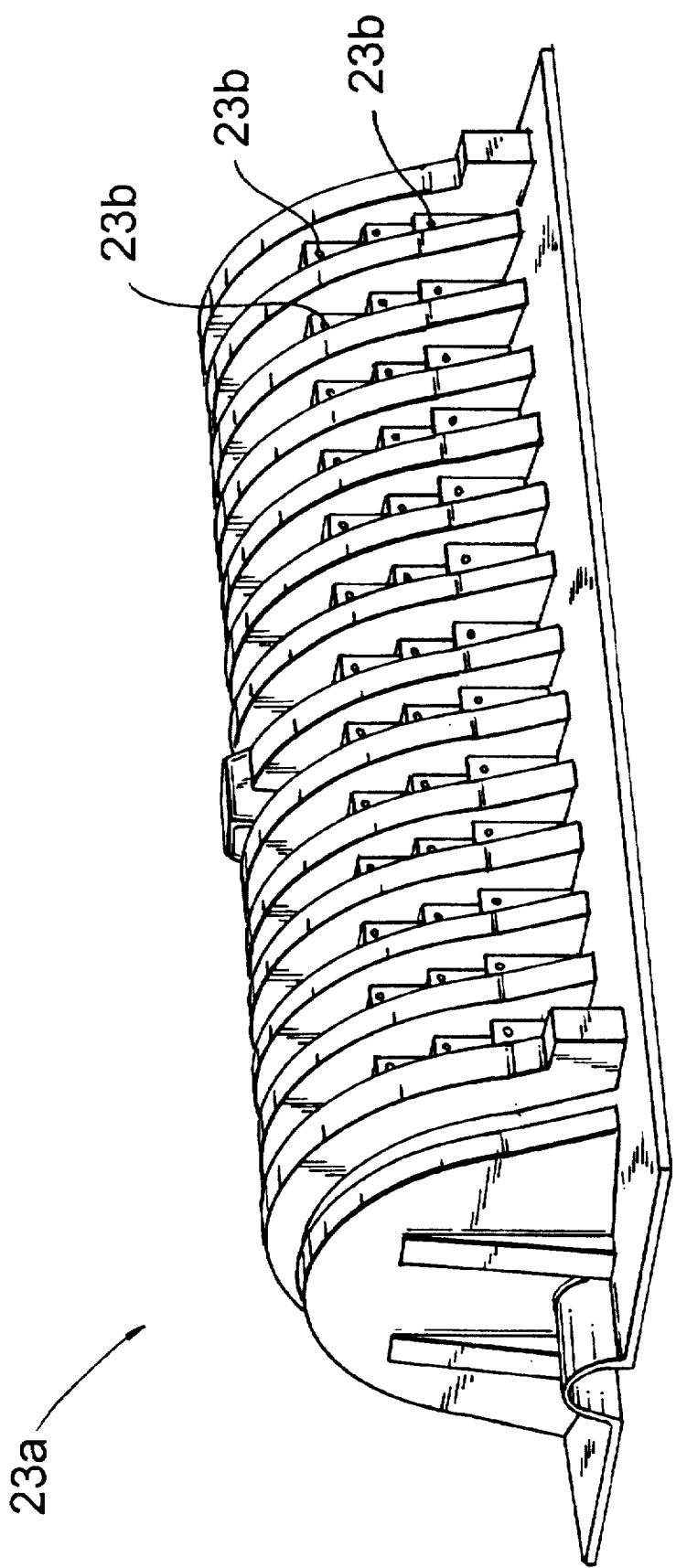
FIG. 3A is a perspective view of the inflow control box as in FIG. 3.

As shown in FIG. 3 and 3A, inflow control box 23 of inflow control area 6, is made preferably of a plurality of commercially available perforated plastic half cylindrical sections 23a, such as twelve, which are about seven feet in length each, which sections 23a snap together. In a typical inflow control box, twelve connected sections 23a make up together inflow control box 23, which extends laterally transverse to the flow of stream flow 1. In a preferred embodiment, inflow control box 23 is about 84 feet in width, extending almost across the entire end width "E" of inflow control area 6.

Furthermore, each inflow control box 23 is perforated with a plurality of holes 23b, to allow stream flow 1 to pass therethrough after sludge has been trapped within inflow control box 23.

The individual components of inflow control box 23 are prefabricated and are available in a variety of sizes so that almost any pretreatment sludge storage requirement can be accommodated. Cultec, Inc. of Brookfield Conn. makes two styles under the trade names of CONTRACTOR™ and TRIPDRAIN™ in a variety of sizes, such as 7.5 feet in length, 28 inches in width and 18 inches in height By installing one or more supplemental air diffuser lines 24 along the bottom length of inflow control box 23, typically anaerobic influents are oxygenated Introducing air through diffuser line 24 optimizes nitrification and enhances biological oxygen demand (BOD) removal from untreated water flow 1.

Although other air capacities may be provided, in a typical example, air is supplied via diffuser lines 24 at about 4 psi from a 3 HP, 230V air blower, which operates at about 2250 RPM with a daily delivery of 151,200 CF. This facilitates the initial precipitation of sludge within inflow control box 23 where it is isolated from respective treatment media substrates 25, 25a of treatment cells 13, 14. This stored sludge can be periodically removed hydraulically through strategically placed ports 30 in the top of inflow control box 23.

With proper maintenance, treatment system failure attributable to head-end clogging can be effectively eliminated The dissolved oxygen is supplied to the system in either liquid or in mechanical form from air compressors(not shown). The liquid method is attractive to remote sites with no electric power or in installations where noise is to be minimized. Liquid oxygen tanks (not shown) can supply the required flow for periods of months without replenishment The sludge management feature and the dissolved oxygen feature can be used either collectively as described, or individually to meet a particular application requirement It is estimated that the use of the influent distribution system with inflow control box 23 at inflow control area 6, not only enhances treatment performance and increases the operational design life of respective media substrates 25, 25a within cells 13, 14, but also reduces the size, and hence cost, of media substrates 25, 25a within treatment cells 13, 14, by as much as 40 percent.

Nutrient Addition Chamber Embodiment

In addition to the anti-clogging features of inflow control area 6, another novel feature of constructed wetland 1 is nutrient addition chamber 4.

Figure 4:
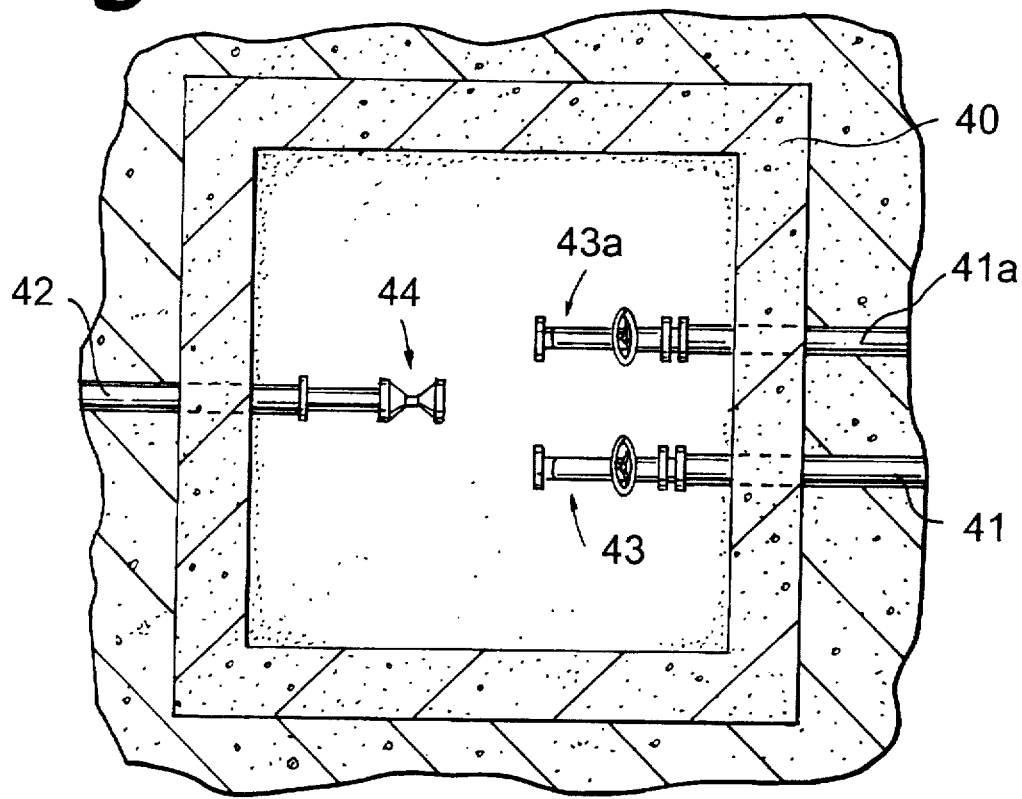
FIG. 4 is a top plan view of influent control/fertilizer addition chamber portion of a constructed wetland of the present invention; and, FIG. 5 is a side elevational view in cross section of the influent control/fertilizer addition chamber as in FIG. 4.
Figure 5:
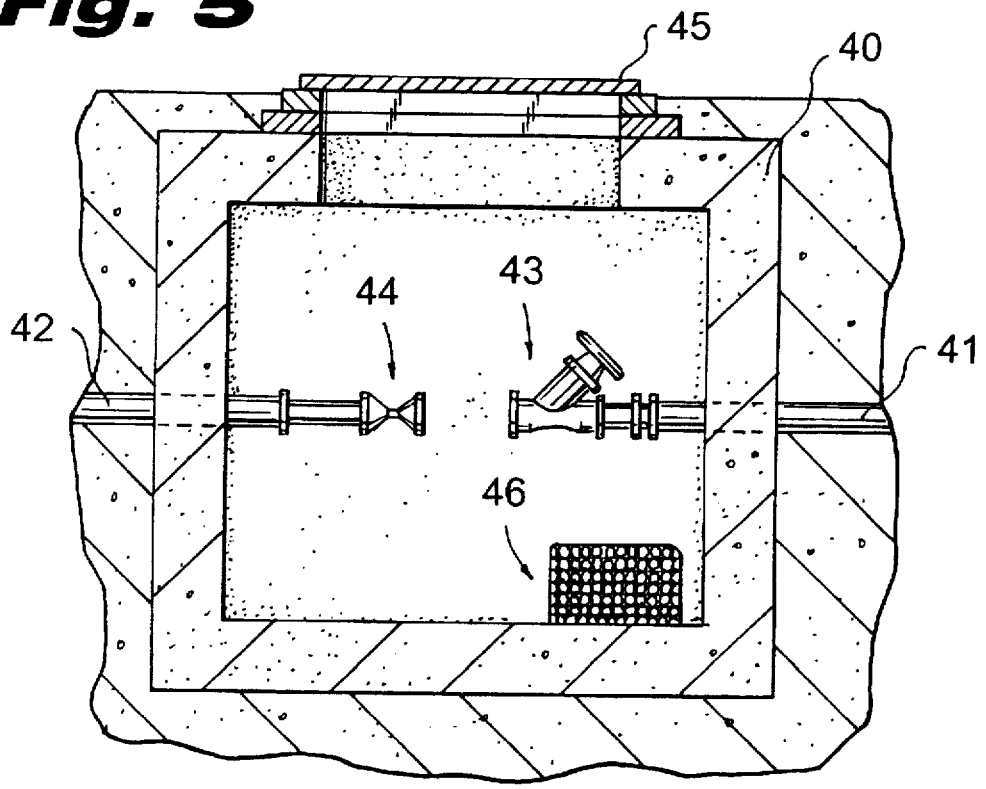

As shown in FIGS. 4 and 5, nutrient addition chamber 4 is designed to provide a convenient and low-cost means of dispensing nutrients to-biologically-based wastewater treatment systems The specific object of the present invention is the passive solubilization and release of one or more nutrients (i.e. phosphorus, nitrogen, potassium, and trace micronutrients, etch, such as calcium, magnesium, copper, iron, zinc, manganese, boron, molybdenum, and sulfur from dissolvable granular or briquette type commercial fertilizers The nutrients may be derived from isobutylidene diurea, magnesium silico-phosphate, potassium silicate, potassium sulfate, calcium silicate, copper oxide, iron oxide, manganous oxide and zinc oxide.

A typical example of a granular dissolvable briquette is that sold under the tradename WOODSCAPE of Vigoro Industries, Inc. of Winter Haven, Fla., having nitrogen at 9% of total weight, phosphate at 9% of total weight, potash at 4% of total weight, calcium at 3% of total weight and magnesium at 2% of total weight as well as trace amounts of other micronutrient trace elements, including copper at 0.06% of total weight, iron at 1% of total weight, managanese at 0.23% of total weight and zinc at 0.14% of total weight The nutrient-enriched effluent from nutrient addition chamber 4 is then distributed to the receptor system of cells 13, 14 where it is available for immediate use by the targeted biological community of plants 27, 28 and microbes symbiotically existing thereat Nutrient addition chamber 4 uses kinetic energy derived from flowing water and in-situ dissolution of granular fertilizer briquette 46, to supply nutrients to plants in treatment cells 13, 14. The nutrients enhance indigenous microbial growth in the root systems of plants 27, 28 within treatment cells 13, 14.

Fertilizer briquette 46 preferably includes phosphates, which dissolve in water and which are useful in biologically mediating hydrocarbon removal in water in upstream untreated water flow 1.

The phosphates also fertilize the roots of plants 27, 28, whose roots burrow down through respective upper plant accommodating soil, gravel, organic or synthetic substrate caps 26, 26a and through lower soil and/or gravel treatment media 25, 25a, through which water flows in the direction D1 –D2, as indicated by the arrows in FIG. 1A.

Water to be treated is maintained below upper plant material substrate caps 26, 26a, so that there is no pooling of excess water thereat Microbes on the roots of plants 27, 28 act to break down the hydrocarbons within water within treatment cells 13, 14 and the fertilizer from briquette 46, feed the microbes on the roots of plants 27, 28.

Novel features of the nutrient addition chamber 4 include simplicity of design, a convenient access door and valve-controlled influent and effluent lines. The dissolution rate can be controlled through product manipulation (i.e. water solubility of selected fertilizers), hydraulic retention time manipulation and/or through mechanical and gravitational agitation.

Nutrient addition chamber 4 can be sized to accommodate almost any hydraulic retention time or fertilizer charging schedule. In addition, nutrient chamber 4 can be installed either above or below grade and is designed for either active (i.e. pump-controlled) or passive (head-controlled) operation. Nutrient addition chamber 4 is especially useful in remote applications where conventional nutrient addition practices are time and cost-preclusive.

FIG. 4 shows a top view section through a concrete vault 40 which forms the influent control/fertilizer addition chamber 4. Inlet conduit 42 is provided to introduce wastewater with chamber inlet valve 44 is shown. Two outlet valves 43, 43a with conduits 41, 41a lead to two separate treatment cells 13 and 14 as shown in FIG. 1.

The number of chamber inlets and outlets is site specific, and the significant factor is that each inlet 42 and outlet 43, 43a has its own flow control valve for proper adjustment of flow rates into and out of vault 40 of nutrient addition chamber 4.

FIG. 5 is a side view section of influent control/fertilizer addition chamber 4. Cover 45, such as checkered plate cover, is shown at the top of vault 40 of nutrient addition chamber 4. Fertilizer briquettes 46 in a mesh bag are shown inside nutrient addition chamber 4.

Although hand operated valves 43 and 44 are shown in FIG. 5, motor driven valves which are remotely controlled by a system computer system can be substituted. This permits automated control that would regulate the nutrient addition and/or flow as dictated by system parameters sensed by the computer control system throughout the constructed wetland A remotely controlled agitator (not shown) inside nutrient addition chamber 4 can complement such an automated installation by providing another independent method of controlling the rate of dissolution of fertilizer from briquette 46 within passive nutrient chamber 4 to respective water accommodating substrate media 25, 25a.

It is further noted that other modifications may be made to the present invention, without departing from the scope of the invention, as noted in the appended claims.

For example, the constructed wetland may have either the flow divider features, as shown in FIGS. 2–3, or the nutrient addition chamber features, as shown in FIGS. 4–5, or preferably, both combined in a constructed wetland, according to the present invention.

I claim:

1. A subsurface flow constructed wetland for the treatment of a variety of flowing wastewater effluents of a polluted stream flow of wastewater, for providing pretreatment clog-reducing wastewater sludge disintegration, and for adding pre-treatment nutrients to wastewater so as to enhance microbial growth therein for improving the effectiveness and efficiency of wastewater treatment, comprising

9 a. a wastewater treatment system flow intake;

b. a pre-treatment nutrient addition chamber, said nutrient addition chamber including a dissolvable nutrient member therein and a means for dissolving and transporting said nutrient member incrementally to said wastewater;

c. a wastewater flow divider having a compressed air aerator in a bottom thereof for receiving said wastewater from said chamber;

d. a treatment cell for receiving aerated wastewater having a water retaining media substrate cap covering a further water retaining media accommodating the wastewater to be treated, said substrate cap being populated by natural plants having root systems within said substrate cap, said plant root systems extending from said substrate cap downward into said further water retaining media accommodating the wastewater being treated, said roots absorbing the dissolved nutrient member therein, said roots serving to biologically mediate the removal of undesirable components from the wastewater so as to cleanse and thus treat said wastewater;

e. said flow divider including an inflow control box lying across a head-end of said treatment cell and a conduit conveying wastewater to be treated into said inflow control box, said conduit intersecting with a lateral distribution header extending perpendicular to said conduit; and f. a treated water discharge conduit for discharging the flowing water into a desired after treatment water utilization modality.

2. The constructed wetland as in claim 1 wherein said flow intake directs water from a polluted stream to an inflow apron.

3. The constructed wetland as in claim 1 wherein said flow intake further comprises an energy dissipation chamber.

4. The constructed wetland as in claim 1 wherein said pre-treatment nutrient addition chamber includes a dissolvable fertilizer member.

5. The constructed wetland as in claim 4 wherein said dissolvable fertilizer member includes a briquette of fertilizer dissolvable at a controlled rate by contact with said wastewater.

6. The constructed wetland as in claim 4 wherein said fertilizer member comprises at least one phosphate composition.

7. The constructed wetland as in claim 4 wherein said fertilizer member comprises a composition selected from the group consisting of phosphorus, nitrogen, potassium, potash, calcium, magnesium, cooper, iron, zinc, manganese, boron, molybdenum, and sulfur.

8. The constructed wetland as in claim 4 wherein at least one flow control valve provides said wastewater at controlled rates to said dissolvable fertilizer member, to incremental dissolve said dissolvable fertilizer member in said waste water, and said dissolvable fertilizer member is provided in said dissolved state to fertilize said plants of said constructed wetland.

9. The constructed wetland as in claim 4 wherein said dissolvable fertilizer member is fed to microbes inhabiting said roots of said plants of said constructed wetland.

10. The constructed wetland as in claim 4 wherein said dissolvable fertilizer member includes a granular mixture of fertilizer dissolvable at a controlled rate by contact with said wastewater.

11. The constructed wetland as in claim 1 wherein said discharge conduit comprises at least one effluent collection

10 piping located across a tail end of each constructed wetland treatment cell and through separate conduits to a level control chamber where the flow merges and passes to a stormwater by-pass chamber and thence to an outflow apron finally to an existing stream bed.

12. The constructed wetland as in claim 1 wherein said treatment cell includes a water impermeable liner, a lower layer of larger stone or other organic, soil or synthetic type treatment media filling a lower portion of said cell and an upper substrate cap of smaller stone, organic, soil or synthetic material forming a planting substrate for plants.

13. The constructed wetland as in claim 1 further comprising an air diffuser line directing compressed air through strategically placed self-cleaning diffusers to aerate wastewater inside said control box.

14. The constructed wetland as in claim 13 wherein said flow divider lies across an entire width of a head end of said at least one treatment cell.

15. The constructed wetland as in claim 13 wherein said flow divider includes a semi-cylindrical perforated chamber extending laterally across a length of said at least one treatment cell.

16. A subsurface flow constructed wetland for the treatment of a variety of flowing wastewater effluents of a polluted stream flow of wastewater, for providing pretreatment clog-reducing wastewater sludge disintegration, for improving the effectiveness and efficiency of wastewater treatment, comprising:

a. a wastewater treatment system flow intake, b. a wastewater flow divider, the flow divider further having a compressed air aerator in a bottom thereof, and c. a treatment cell having a water retaining media substrate cap covering a further water retaining media accommodating the wastewater to be treated, said substrate cap being populated by natural plants having root systems within said substrate cap, said plant root systems extending from the soil downward into said further water retaining media accommodating the wastewater being treated, said roots serving to biologically mediate the removal of undesirable components from the wastewater so as to cleanse and thus treat said wastewater;

d. said wastewater flow divider including an inflow control box lying across a head-end of a constructed wetland treatment cell and a conduit conveying wastewater to be treated into said inflow control box; and e. a treated water discharge conduit for discharging the flowing water into a desired after treatment water utilization modality.

17. The constructed wetland as in claim 16 wherein said flow intake directs water from a polluted stream to an inflow apron.

18. The constructed wetland as in claim 16 wherein said flow intake further comprises an energy dissipation chamber.

19. The constructed wetland as in claim 16 wherein said discharge conduit comprises at least one effluent collection piping located across a tail end of each constructed wetland treatment cell and through separate conduits to a level control chamber where the flow merges and passes to a stormwater by-pass chamber and thence to an outflow apron finally to an existing stream bed.

20. The constructed wetland as in claim 16 wherein said treatment cell includes a water impermeable liner, a lower layer of larger stone, soil, organic or synthetic treatment media filling a lower portion of said cell and an upper substrate cap of smaller stone soil, organic or synthetic media forming a planting substrate for plants.

21. The constructed wetland as in claim 16 further comprising an air diffuser line directing compressed air through strategically placed self-cleaning diffusers to aerate wastewater inside said control box.

22. The constructed wetland as in claim 21 wherein said flow divider lies across an entire width of a head end of said at least one treatment cell.

23. The constructed wetland as in claim 21 wherein said flow divider includes a semi-cylindrical perforated chamber extending laterally across a length of said at least one treatment cell.

24. An underground flow constructed wetland for use with and not disturbing the course of an existing stream of polluted water comprising:

a) an artificially constructed underground wetland located in the path of said stream;
   b) flow intake means for directing said stream into said underground wetland;
   c) pre-treatment chamber means in said underground wetland for receiving said stream and controllably dissolving selected nutrients into said stream;
   d) water treatment cell means within said underground wetland for receiving said stream containing said nutrients having a water retaining media substrate cap covering a further water retaining media accommodating said stream to be treated, said cap being populated by natural plants at ground level having root systems within said substrate cap, said plant root systems extending from said substrate cap downward into said further retaining media accommodating the stream water being treated, said roots absorbing said dissolved nutrients in said water, said roots serving to biologically mediate the removal of undesirable components from the polluted stream water so as to cleanse and thus treat said polluted stream water; and
   e) treated water discharge means for discharging the flowing water into a desired after treatment water utilization modality.

25. The wetland of claim 24 having means to aerate the nutrient rich wastewater before entering said cell.

26. The method of treating in situ and without disturbing the course of an existing stream of polluted water in an underground flow artificially constructed wetland comprising the steps of:

a) constructing an underground wetland in the path of said stream:
   b) directing said stream into said underground wetland;
   c) pre-treating said stream in said wetland by controllably dissolving selected nutrients into said stream;
   d) directing said stream into a water treatment cell having a water retaining media substrate cap covering a further water retaining media for accommodating said stream to be treated, said cap being populated by natural plants at ground level having root systems within said substrate cap, said plant root systems extending from said substrate cap downward into said further retaining media accommodating the stream water being treated, said roots absorbing said dissolved nutrients in said water, said roots serving to biologically mediate the removal of undesirable components from the polluted stream water so as to cleanse and thus treat said polluted stream water; and
   e) discharging the flowing water from said cell into a desired after treatment water utilization modality.

27. The method of claim 26 in which the nutrient rich wastewater is aerated before entering said cell.

* * * * *